US007499791B2

(12) United States Patent
You et al.

(10) Patent No.: US 7,499,791 B2
(45) Date of Patent: Mar. 3, 2009

(54) VIBRATION REDUCING SYSTEM AT KEY-OFF AND METHOD THEREOF

(75) Inventors: Sung Il You, Hwaseong (KR); Dae Woo Lee, Hwaseong (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 11/949,242

(22) Filed: Dec. 3, 2007

(65) Prior Publication Data

US 2009/0030594 A1 Jan. 29, 2009

(30) Foreign Application Priority Data

Jul. 23, 2007 (KR) ...................... 10-2007-0073569

(51) Int. Cl.
*G06F 19/00* (2006.01)

(52) U.S. Cl. ...................................................... 701/112

(58) Field of Classification Search ................. 701/112, 701/102, 111, 115

See application file for complete search history.

(56) References Cited

U.S. PATENT DOCUMENTS 4,557,235 A * 12/1985 Amemori et al. ............ 123/367
6,104,977 A * 8/2000 Avery, Jr. .................... 701/101

* cited by examiner

*Primary Examiner*—Hieu T Vo
(74) *Attorney, Agent, or Firm*—Morgan, Lewis & Bockius LLP

(57) ABSTRACT

A system and method for controlling engine shutoff at vehicle ignition key-off. An ignition module performs ignition in the engine's cylinders according to a predetermined ignition sequence. An engine module detects the cylinder in which ignition currently occurs. An engine control module controls the engine to stop operating only after a predetermined condition is satisfied after key-off. The predetermined condition may be that the cylinder in which ignition currently occurs is a preselected cylinder, such as the cylinder closest to a flywheel. The method determines whether an ignition key is turned off, detects the cylinder in which ignition currently occurs if the ignition key is turned off, determines whether the cylinder in which ignition currently occurs is a preselected cylinder, and controls the engine to stop only if the cylinder in which ignition currently occurs is the preselected cylinder. The preselected cylinder may be closest to a flywheel.

10 Claims, 5 Drawing Sheets

VIBRATION REDUCING SYSTEM AT KEY-OFF AND METHOD THEREOF

CROSS-REFERENCE TO RELATED APPLICATION

This application claims priority to, and the benefit of, Korean Patent Application No. 10-2007-0073569, filed in the Korean Intellectual Property Office on Jul. 23, 2007, the entire contents of which are incorporated herein by reference.

BACKGROUND OF THE INVENTION (a) Field of the Invention

The present invention relates to a vibration reducing system and method at key-off that control ignition of a preselected cylinder to occur last before engine shutoff.

(b) Description of the Related Art

When a vehicle ignition key is turned off, vibrations occur, particularly in diesel engines since the compression ratio is high and combustion force is very large. These vibrations are unpleasant and may deteriorate marketability.

One method for reducing these vibrations is to stop the engine as soon as possible. Fuel injection is stopped, and a throttle valve is simultaneously closed to cause a cylinder to be in a vacuum state and hinder movement of a piston.

A mechanical throttle actuator, including a vacuum source, a vacuum modulator, and a diaphragm; and an electrical throttle actuator, including a DC motor, are both provided. These throttle actuators are expensive and serve only to reduce vibrations at key-off.

The above information disclosed in this Background section is only for enhancement of understanding of the background of the invention and therefore it may contain information that does not form the prior art that is already known in this country to a person of ordinary skill in the art.

SUMMARY OF THE INVENTION

A system for controlling engine shutoff at vehicle ignition key-off is disclosed. An ignition module performs ignition in the engine's cylinders according to a predetermined ignition sequence. An engine module detects the cylinder in which ignition currently occurs. An engine control module controls the engine to continue operating until a predetermined condition is satisfied after key-off, and may control the engine to stop when the predetermined condition is satisfied after key-off. The predetermined condition may be that the cylinder in which ignition currently occurs is a preselected cylinder, such as the cylinder closest to a flywheel.

The engine module may include a crankshaft position detector and a camshaft position detector. The cylinder in which ignition currently occurs may be detected based on the phase angle of the crankshaft and the phase angle of the camshaft.

A method for controlling engine shutoff at vehicle ignition key-off is also disclosed. The method determines whether an ignition key is turned off, detects the cylinder in which ignition currently occurs if the ignition key is turned off, determines whether the cylinder in which ignition currently occurs is a preselected cylinder, controls the engine to stop if the cylinder in which ignition currently occurs is the preselected cylinder, and may control the engine to continue operation if the cylinder in which ignition currently occurs is not the preselected cylinder. The preselected cylinder may be closest to a flywheel.

Determining the cylinder in which ignition currently occurs may include measuring a phase angle of a crankshaft and a phase angle of a camshaft.

DETAILED DESCRIPTION OF PREFERRED EMBODIMENTS

An exemplary embodiment of the present invention will hereinafter be described in detail with reference to the accompanying drawings.

Figure 1:
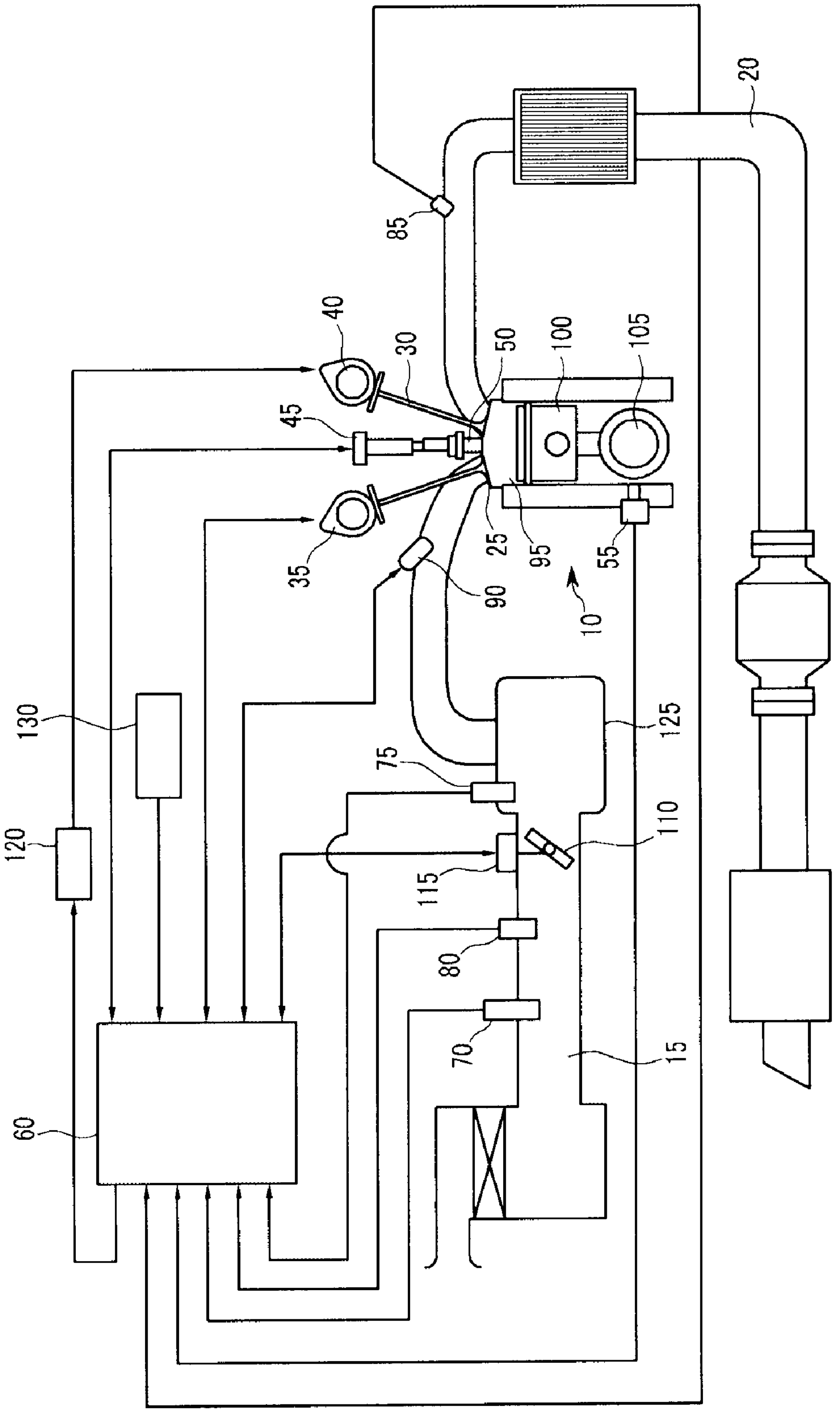
FIG. 1 is a schematic diagram of an engine that uses a vibration reducing system at key-off according to an exemplary embodiment of the present invention.

As shown in FIG. 1, an engine 10 that uses a vibration reducing system according to an exemplary embodiment of the present invention includes cylinders 95, an intake pipe 15, an exhaust pipe 20, an engine control unit (ECU) 60, and a valve timing control unit 120.

The cylinders 95 are provided in a cylinder block and are covered by a cylinder head, and a piston 100 is mounted in each cylinder 95 and is connected to a crankshaft 105. Each piston 100 moves reciprocally by combustion force of a fuel, and rotates the crankshaft 105.

The cylinder head of the cylinders 95 is connected with the intake pipe 15 and the exhaust pipe 20. The intake pipe 15 and the exhaust pipe 20 are closed or opened by an intake valve 25 and an exhaust valve 30, respectively.

In addition, the intake valve 25 and the exhaust valve 30 are respectively operated by an intake valve cam 35 and an exhaust valve cam 40. The intake valve cam 35 and the exhaust valve cam 40 are connected to the valve timing control unit 120 and are controlled thereby.

A surge tank 125 is mounted at the intake pipe 15 and a throttle valve 110 is mounted at a front side of the surge tank 125. A catalytic converter for filtering noxious material is mounted at the exhaust pipe 20.

An ignition plug 50 for performing ignition is mounted at the cylinder 95.

A coolant pipe where coolant flows is mounted at the cylinder block.

In addition, a crankshaft position detector 55 is mounted at the crankshaft 105. The crankshaft position detector 55 detects a phase angle of a crankshaft and transmits a signal corresponding thereto to the engine control unit 60.

In addition, a camshaft position detector 130 is mounted at a camshaft that controls operation of the intake valve cam 35 and the exhaust valve cam 40. The camshaft position detector 130 detects a phase angle of the camshaft and transmits a signal corresponding thereto to the engine control unit 60.

Air flows in the intake pipe 15 and is mixed with fuel, and the air/fuel mixture is supplied to the cylinder 95. An intake pressure detector 70, an intake temperature detector 80, an air flow meter 75, a throttle opening detector 115, and a fuel injection valve 90 are mounted at the intake pipe 15. The intake pressure detector 70, the intake temperature detector 80, the air flow meter 75, and the throttle opening detector 115 detect pressure of the intake air, temperature of the intake air, amount of intake air, and an opening of the throttle valve (operated by the accelerator pedal), respectively, and transmit signals corresponding thereto to the engine control unit 60.

The engine control unit 60 controls the fuel injection valve 90 to control fuel injection.

An exhaust pressure detector 85 is mounted at the exhaust pipe 20. The exhaust pressure detector 85 detects pressure of the exhaust gas exhausted to the atmosphere through the exhaust pipe 20, and transmits a signal corresponding thereto to the engine control unit 60.

The engine control unit 60 may include one or more processors activated by a program that performs a vibration reducing method according to an exemplary embodiment of the present invention. The engine control unit 60 may also include a memory and associated hardware, software, and/or firmware as may be selected and programmed by a person of ordinary skill in the art based on the teachings herein.

As mentioned above, the engine control unit 60 receives signals corresponding to the phase angle of the crankshaft, the pressure of the intake air, the temperature of the intake air, the amount of intake air, the opening of the throttle valve, and the pressure of exhaust gas. In addition, the engine control unit 60 controls opening of the throttle valve, fuel injection, and valve timing of the intake valve 25 and the exhaust valve 30 based on engine speed, the pressure of the intake air, and load, and the valve timing corresponds to a residual gas ratio.

Figure 2:
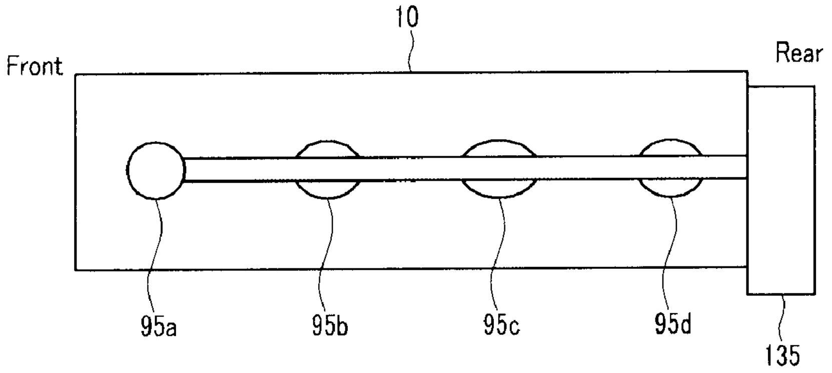
FIG. 2 is a schematic diagram of the cylinders of the engine of FIG. 1.

As shown in FIG. 2, first, second, third, and fourth cylinders 95*a*, 95*b*, 95*c*, and 95*d* are disposed as shown. A flywheel 135 is mounted at the rear of the engine. A four-cylinder engine is described for purposes of example only. It should be appreciated that the present invention is not limited to any particular number of cylinders.

Figure 3:
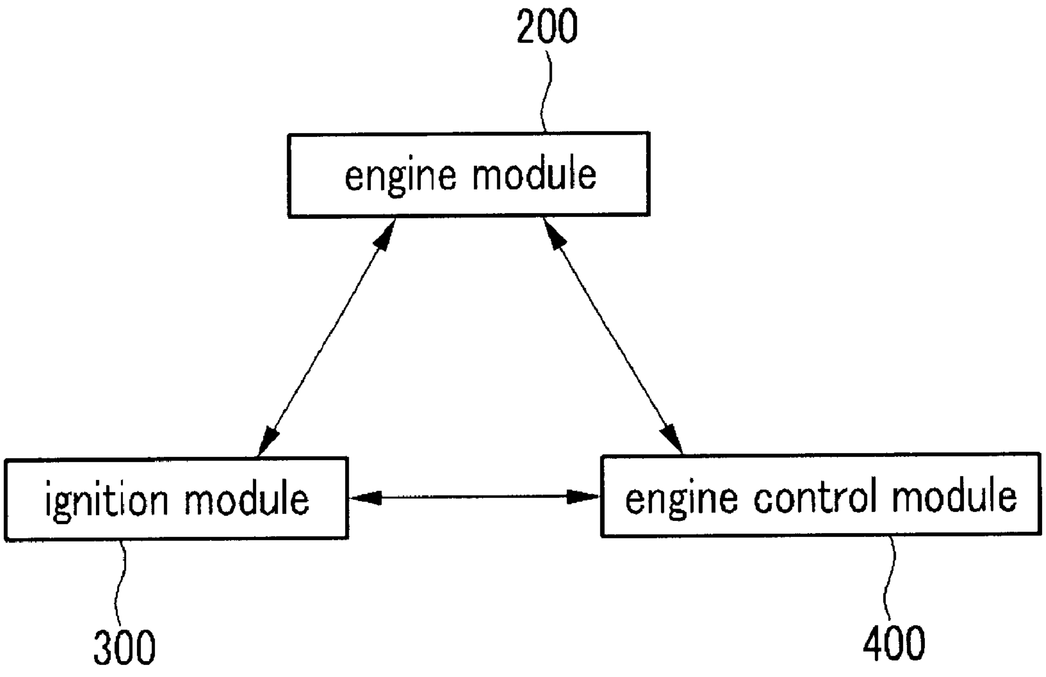
FIG. 3 is a block diagram of a vibration reducing system at key-off according to an exemplary embodiment of the present invention.

As shown in FIG. 3, a vibration reducing system at key-off according to an exemplary embodiment of the present invention includes an engine module 200, an ignition module 300, and an engine control module 400.

The engine module 200 detects the cylinder 95 *a, b, c*, or *d* in which ignition currently occurs, and a current state of the engine. In addition, an ignition sequence of the cylinders 95 is stored in the engine module 200, and the engine module 200 controls the ignition module 300 according to the ignition sequence of the cylinders 95. One example of the ignition sequence is 95*a*, 95*c*, 95*d*, and 95*b*, in that order.

The engine module 200 includes the crankshaft position detector 55 and the camshaft position detector 130. The engine module 200 calculates the cylinder 95 *a, b, c*, or *d* in which ignition currently occurs based on the phase angle of the crankshaft 105 and the phase angle of the camshaft, and transmits a signal corresponding thereto to the engine control module 400. This calculation can be programmed by a person of ordinary skill in the art based on the teachings herein.

The ignition module 300 performs ignition according to the ignition sequence of the cylinders 95 stored in the engine module 200.

The engine control module 400 controls an operation of the engine 10 based on the current state of the engine 10. That is, the engine control module 400 controls an injector and a fuel rail valve for controlling fuel injection, the throttle valve 110 for controlling air intake, and the catalytic converter and a catalyzed particulate filter (CPF) for filtering exhaust gas.

In addition, when the engine control module 400 detects that the ignition key is turned on, the engine control module 400 begins fuel injection and opens the throttle valve 110 and the fuel rail valve. When the engine control module 400 detects that the ignition key is turned off, the engine control module 400 stops fuel injection and closes the throttle valve 110 and the fuel rail valve.

Hereinafter, a vibration reducing method at key-off according to an exemplary embodiment of the present invention will be described in detail.

Figure 4:
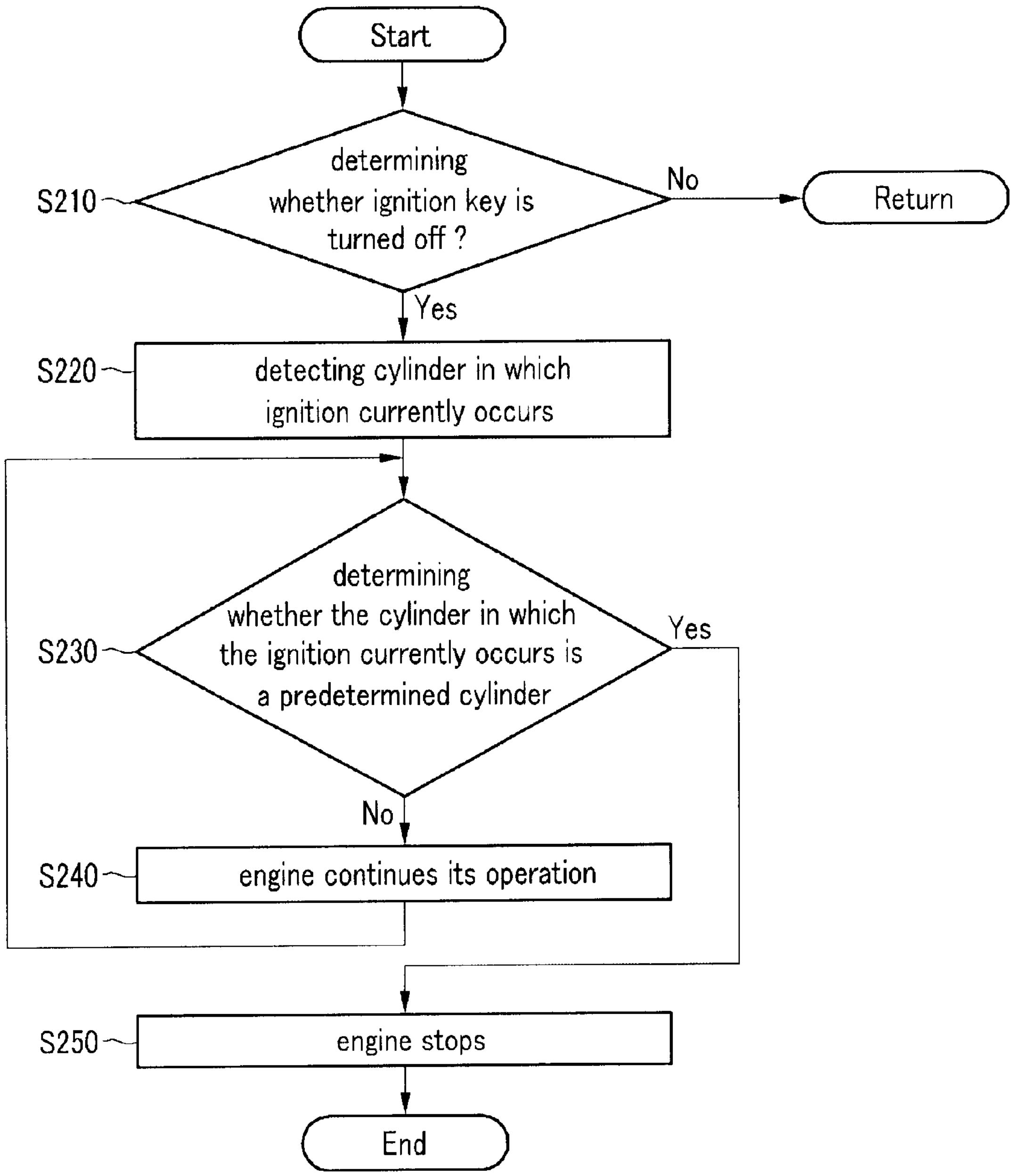
FIG. 4 is a flowchart of a vibration reducing method at key-off according to an exemplary embodiment of the present invention.

As shown in FIG. 4, the engine control module 400 determines whether the ignition key is turned off at step S210. If the ignition key is not turned off, the engine control module 400 controls the engine 10 to be operated.

If the ignition key is turned off, the engine module 200 detects the cylinder 95 *a, b, c*, or *d* in which ignition currently occurs at step S220.

After that, the engine module 200 determines whether the cylinder 95 in which ignition currently occurs is a predetermined cylinder at step S230.

Figure 5A:
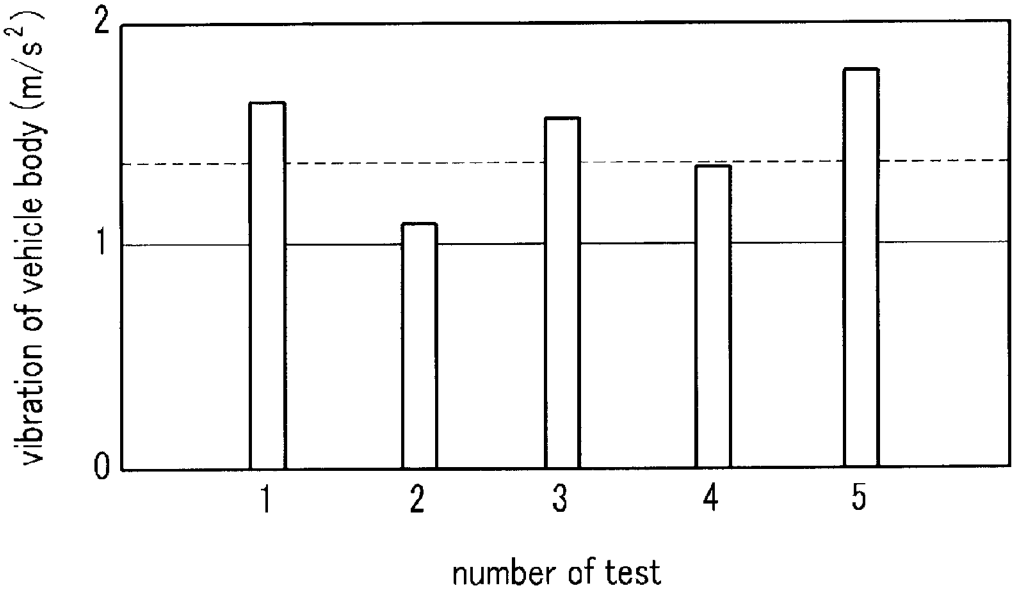
FIG. 5A and FIG. 5B are graphs showing vibration of a vehicle body and a power train, respectively, at key-off.
Figure 5B:
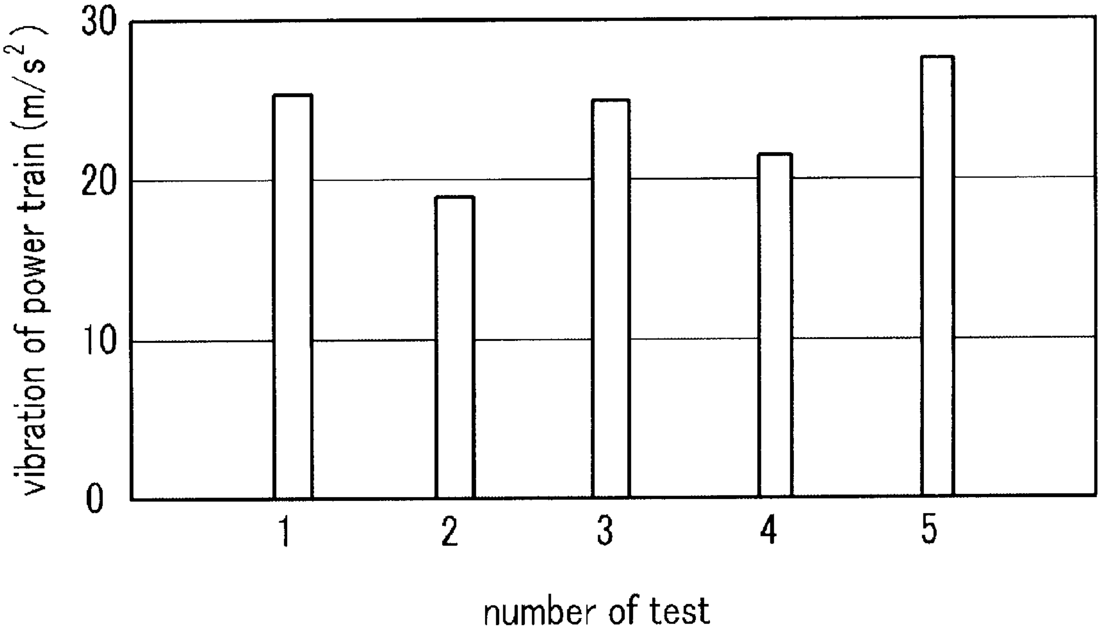
Figure 6A:
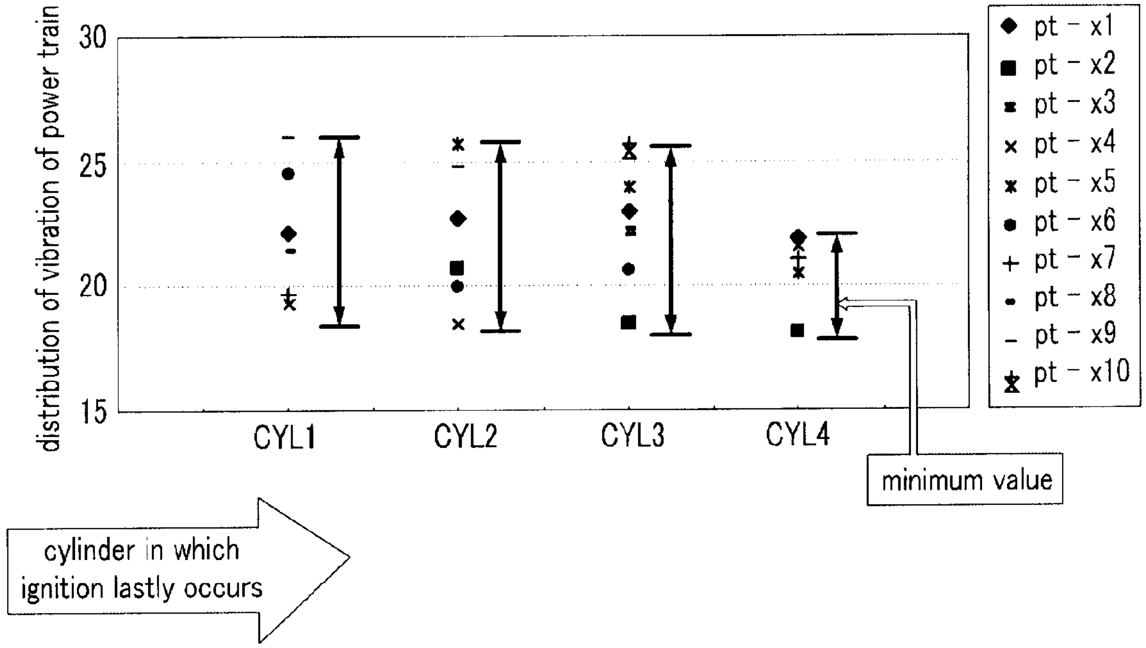
FIG. 6A and FIG. 6B are graphs showing distribution of vibrations of a vehicle body and a power train, respectively, based on in which cylinder the last ignition occurs.
Figure 6B:
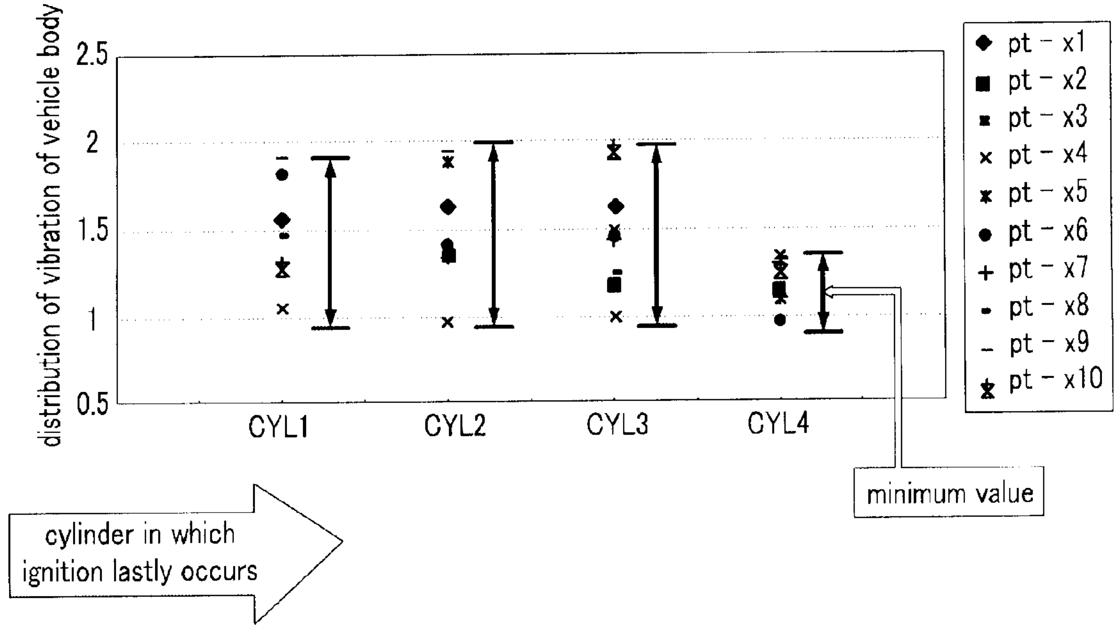

The predetermined cylinder 95*d* may be selected by a person of ordinary skill in the art, for example, referring to FIGS. 5 and 6, when a throttle actuator is not used, vibrations of the vehicle body and the power train at key-off vary depending on the cylinder in which ignition currently occurs.

As shown in FIG. 6, when ignition currently occurs at key-off in the fourth cylinder 95*d* that is closest to the flywheel, vibration of the vehicle body and the power train is low. Therefore, vibration may be reduced by controlling that ignition must currently occur in the fourth cylinder 95*d*.

Referring back to FIG. 4, if the cylinder in which ignition currently occurs is not the predetermined cylinder 95*d* at step S230, the engine control unit 400 controls the engine 10 to continue operation at step S240. If the cylinder in which ignition currently occurs is the predetermined cylinder 95*d* at step S230, the engine module 200 transmits a signal to the engine control module 400 and the engine control module 400 stops the engine 10, at step S250.

For example, if the cylinder in which ignition currently occurs is the second cylinder 95*b*, the engine control module 400 controls the engine 10 to continue operation. Ignition then occurs in the first cylinder 95*a*, the third cylinder 95*c*, and the fourth cylinder 95*d*. When ignition occurs in the fourth cylinder 95*d*, the engine control module 400 stops the engine 10.

According to the present invention, since the engine is stopped after the last ignition occurs in the predetermined cylinder at key-off, vibration of the vehicle body and the power train may be reduced.

In addition, no expensive throttle actuator is necessary, reducing the vehicle price.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for controlling engine shutoff at vehicle ignition key-off, the engine comprising a plurality of cylinders, the system comprising:

an ignition module for performing ignition in the cylinders according to a predetermined ignition sequence of the cylinders;

an engine module for detecting the cylinder in which ignition currently occurs; and an engine control module for controlling the engine to continue operating until a predetermined condition is satisfied after the key-off.

2. The system of claim 1, wherein the predetermined condition comprises the cylinder in which ignition currently occurs being a preselected cylinder.

3. The system of claim 2, wherein the preselected cylinder is closest to a flywheel.

4. The system of claim 1, wherein the engine module comprises a crankshaft position detector for detecting a phase angle of a crankshaft and a camshaft position detector for detecting a phase angle of a camshaft.

5. The system of claim 4, wherein the cylinder in which ignition currently occurs is detected based on the phase angle of the crankshaft and the phase angle of the camshaft.

6. The system of claim 1, wherein the engine control module further controls the engine to stop when the predetermined condition is satisfied after the key-off.

7. A method for controlling engine shutoff at vehicle ignition key-off, the engine comprising a plurality of cylinders, the method comprising:

determining whether an ignition key is turned off;

detecting the cylinder in which ignition currently occurs if the ignition key is turned off;

determining whether the cylinder in which ignition currently occurs is a preselected cylinder; and controlling the engine to stop if the cylinder in which ignition currently occurs is the preselected cylinder.

8. The method of claim 7, wherein the preselected cylinder is closest to a flywheel.

9. The method of claim 7, wherein determining the cylinder in which ignition currently occurs comprises measuring a phase angle of a crankshaft and a phase angle of a camshaft.

10. The method of claim 7, further comprising controlling the engine to continue operation if the cylinder in which ignition currently occurs is not the preselected cylinder.

* * * * *